United States Patent Office 2,803,964
Patented Aug. 27, 1957

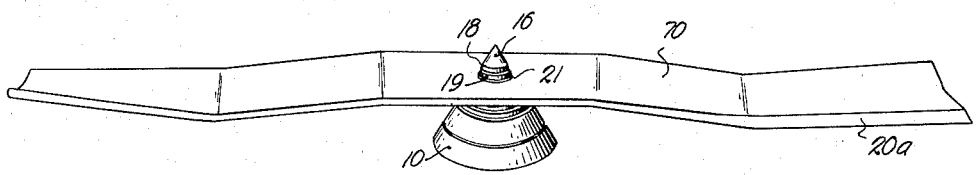
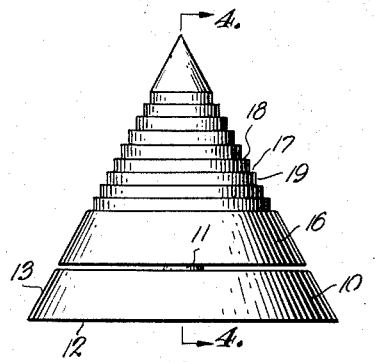
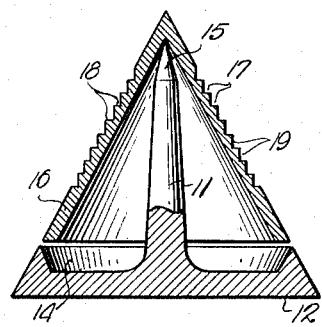
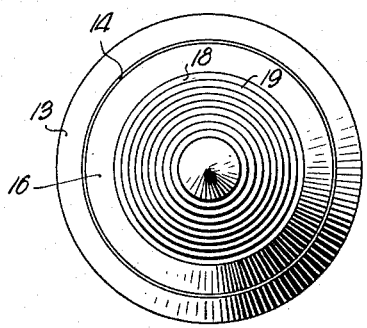
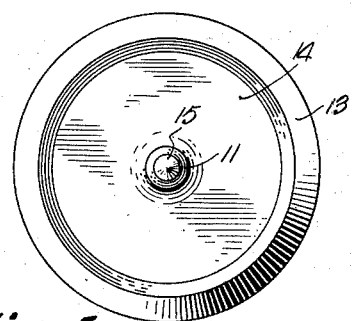

2,803,964

LAWN MOWER BLADE BALANCER

Lowell L. Smith, Carthage, Ill., assignor of fifty percent to Leo K. Smith, Carthage, Ill.

Application January 17, 1956, Serial No. 559,593

4 Claims. (Cl. 73—484)

This invention relates to devices for estimating the correctness of balance in lawn mower blades and refers more particularly to such a balance determining device operable to gauge the degree of balance in the blades employed in power lawn mowers of the rotary type.

Balance determining devices have been previously provided in various fields of technique for determining the symmetry, balance or relative true of various parts, mechanisms, etc. Such devices, to achieve the desired degree of precision, have previously been necessarily of relatively heavy construction, of quite complicated form and, therefore, fairly expensive. Additionally, such devices have not been provided wherein a stable mount has been provided for the part to be gauged, which mount is adaptable to variably sized engagement with such article. Finally, previous balance indicators have not been found which indicate the degree of imbalance by direct displacement of the mounting unit relative its support without additional indicating devices thereon.

It should not be necessary to labor the absolute and fundamental importance of balance in rotating parts supported by a drive shaft. Imbalance in such a part, whether it be a wheel, a blade or other construction, greatly increases the wear on any bearings or packing glands supporting the rotating drive shaft, greatly increases the vibration in the rotating unit itself, the drive shaft and the power source, which vibration may be transmitted to the entire operating mechanism, and often may actually cause danger to the operator of the mechanism if such imbalance is not corrected. In the case of a lawn mower, vibration in the blade shortens the engine and mower life and lessens the efficiency and effectiveness of the grass cutting operation.

Therefore, an object of the invention is to provide a balancer for testing the imbalance of lawn mower blades which is simple in construction, cheap to manufacture and extremely strong and sturdy.

Another object of the invention is to provide a balance indicating device for lawn mower blades having mounting means for the blades adaptable to receive any size drive shaft opening in the blade while mounting the blade completely true relative the balance mount.

Another object of the invention is to provide a balance indicator for lawn mower blades wherein the relative position of the blade mount to the blade mount support indicates with great sensitivity the true balance relationship of the blade.

Another object of the invention is to provide a balance indicator for testing lawn mower blades which is extremely small in size, light in weight and, therefore, portable, said indicator having no structural weaknesses requiring any special care.

Another object of the invention is to provide a balance indicator for lawn mower blades which permits high speed mounting of the blade on the indicator and which has only two parts.

Other and further objects of the invention will appear in the course of the following description thereof.

In the drawings, which form a part of the specification and are to be read in conjunction therewith, an embodiment of the invention is shown and, in the various views, like numerals are employed to indicate like parts.

Fig. 1 is a perspective view of the inventive lawn mower blade balancer shown with a lawn mower blade positioned thereon.

Fig. 2 is a side view of the inventive lawn mower blade balancer.

Fig. 3 is a top view of the blade balancer shown in Fig. 3.

Fig. 4 is a view taken along the lines 4—4 of Fig. 2 in the direction of the arrows.

Fig. 5 is a top view of the base with the blade mounting cone removed therefrom.

The invention as shown in the drawings comprises a base 10 having centrally mounted thereon an upwardly extending pin 11. Pin 11 is rigidly and fixedly attached to the central portion of the base and extends vertically upwardly therefrom. The base 10 is flat on the bottom portion 12 thereof and has sloping edges or sides 13 which are preferably of a shape to approximate the base of a cone. The central portion of the base upper face is hollowed out as shown in Fig. 4 at 14. The central pin 11 has sharpened tip 15. Hollow cone 16 is mountable upon the tip of the upwardly extending pin 11. The outside diameter of the lower edge of the cone is preferably essentially equal to the outside diameter of the upper edge of the base 10. The face angles of base 13 and the cone 16 are preferably continuous so that when the mounting cone is mounted on the pin 11 the faces of the mounting cone and the base are essentially continuous.

A plurality of circumferential grooves 17 are formed in the outside face of the mounting cone whereby to form horizontal shelves 18. The inner faces of said grooves are preferably vertical as shown at 19. The horizontal shelves 18 serve to support the lawn mower blades in a horizontal direction to avoid tilting or uneven mounting of the blades on the cone. (A modification of the invention contemplates a smooth faced cone but the shelved face is preferred, especially where the object to be balanced has a truly cylindrical mounting orifice therein. In a tapered orifice a smooth faced cone might be preferable.) The lawn mower blades 20, as shown in Fig. 1, have central drive shaft opening 21 therein whereby to mount the lawn mower blades on the drive shaft of the rotary motor and sharpened cutting portions 20a. The blade is fitted down over the mounting cone and, depending upon the diameter of the drive shaft hole 21 therein, is received upon one of the horizontal shelves 18. Preferably, the diameter of the outside face of the lower edge of the mounting cone 16 is much greater than the diameter of any of the drive shaft mounting holes in conventional lawn mower blades 20. The shelves 18 are cut into the face of the cone (or cast therein) so that the shelf of least outside diameter is of lesser diameter than any conventional lawn mower drive shaft mounting opening in the blade and the lower shelf in the series is of greater diameter. Thus any conventional lawn mower blade may be mounted on the mounting cone.

The interior of the cone is preferably hollow, as shown in Fig. 4, with the inner faces of the cone parallel to the outer faces thereof. Thus it is seen that the cone is mounted essentially on the tip of the point 15 and may rotate or tilt thereabout, depending upon the application of force or weight thereto. Symmetrical circumferential weight application to the mounting cone will not tilt it relative the pin but any unsymmetrical or asymmetrical application of weight or force thereto will tilt it relative the vertical axis thereof. The hollowed out portion 14 of the base 10 is provided therein to permit relatively full tilting of the mounting cone into the base area without the edge of the cone contacting the base 10 itself. If the lower edge of the cone is sufficiently displaced upwardly from the upper edge of the base 10 then the tilting of the cone would not contact the edge of the base. However, it is desirable to have the edges of the cone and base as closely adjacent one to the other as possible so that any displacement of the cone lower edge relative the base upper edge will break the continuity of the outer surfaces and immediately appear as an obvious displacement of the cone 16 relative the base 10. If the lower edge of the cone were an appreciable distance from the upper edge of the base, even though the pieces were shaped so that the lines of the upper cone were continued in the outer face of the base, any minute displacement of the cone would not be as easily ascertainable due to the gap between the edges. Since the cone and base pieces may be cast each in unitary form there is no particular difficulty about forming the base, as shown in Fig. 4, with a hollowed out portion and, thus, the face of the cone may very closely approach the outer face of the base. However, it is contemplated as a secondary modification that the upper base surface be flat and continuous from the upper edge to the pin and the cone be sized so as to permit it to tilt relative thereto without contacting the face of the base.

Since the cone is supported only essentially at a single point, namely, the tip of the pin 15, it is obvious that the mounting cone may tilt around its 360° axis at any point and not only in certain limited directions. It is also evident that the angle of the inside face of the cone must be such relative the angle of the tip of the pin that the cone can tilt relative thereto without the inner face of the cone contacting the outside face of the pin. This is especially critical in the area 15 as the inside face of the cone approaches its apex. Again, the angularity of the face of the cone and base must not be either too steep or too flat. If the face is too steep there will not be a sufficient variation between the outside diameter of the upper portion of the cone and of the lower portion of the cone and thus a sufficiently large range of diameters to handle the conventional range of lawn mower blade opening diameters will not be provided. If the angle is too flat there will be too great a difference in diameters from one horizontal shelf 18 to the next and intermediate sized lawn mower blade openings will not be stably mountable on the cone. It is obvious that the diameters of the vertical shelves 17 must closely approximate the inner diameter of the lawn mower blade openings or there is opportunity for mismounting and, thus, a misreading of the balance characteristics of the blade. However, there is a large angular variation within which the cone may be constructed and there is no single critical angle to which I wish to limit my invention.

In operation, the sharpened lawn mower blade 20 is seated on the upper movable cone on that horizontal shelf 18 which will properly engage the outer face of the lawn mower blade. The cone 16 is then placed over the peg 11 on the base portion 10. If the lower edge of the cone is not in perfect alignment with the upper edge of the base portion, the blade is not in balance. The blade is then removed and given another touch on the emery wheel or sharpening device on its heavy end. It may then be replaced on the cone 16 and the balance of the blade rechecked. When the blade is mounted on the cone 16 and the lower edges of the cone match circumferentially the upper edges of the base 10 the blade is in perfect balance and may be reinstalled on the lawn mower.

Thus it is seen that any rotary lawn mower blade may be tested on the balancer quickly and easily. Perfect balance can be secured in a matter of seconds and no micrometers or other measuring devices are necessary. The blade balancer permits balancing of the mower blade to a very high degree of perfection.

Thus it is seen that a lawn mower blade balancer has been provided which will eliminate blade vibration in the lawn mower due to unbalanced blades, thus prolonging the engine and lawn mower life, which will insure thereby better and smoother grass cutting, which will fit any rotary mower blade, and which is fast, efficient and easy to operate.

It is obvious that the above described balancing device is not limited in its applications and use to the balancing of lawn mower blades but may profitably be employed in the balancing of any object such as a wheel, a propeller, radially armed objects, etc. While I have developed this device for use with lawn mower blades and it has proved exceedingly efficient in such an application, it is not my intention to limit the invention to this one specific application.

From the foregoing it will be seen that this invention is one well adapted to attain all of the ends and objects hereinbefore set forth together with other advantages which are obvious and which are inherent to the device.

It will be understood that certain features and subcombinations are of utility and may be employed without reference to other features and subcombinations. This is contemplated by and is within the scope of the appended claims.

Inasmuch as various possible modifications of the invention may be made without departing from the scope thereof, it is to be understood that all matter hereinbefore set forth or shown in the accompanying drawings is to be interpreted as illustrative and not in a limiting sense.

What is claimed is:

1. A device for testing the balance of lawn mower blades comprising a base, a vertical pin extending upwardly from said base, said pin fixed at its lower end to said base and having a sharpened upper end thereon, a hollow cone mountable on said pin tip and operable to tilt relative thereto on an asymmetric application of weight thereto, the outer surface of said cone tapering downwardly to a diameter at its lower edge greater than the diameter of the hole of the lawn mower blade drive shaft to be balanced whereby to receive on its outer face said blade drive shaft opening and balance the blade above the base, the outer surface of the base formed so as to be an extension of the outer surface and lower end of the cone whereby canting of the cone on the pin puts the edges of the cone and base next each other out of line whereby imbalance of lawn mower blades is easily detectable.

2. A balancer for testing lawn mower blades as in claim 1 wherein the cone is positioned so that its lower edge is as close to the upper edge of the base as possible yet there is sufficient clearance therebetween to permit tilting of the cone relative the base to indicate imbalance of a lawn mower blade placed thereon.

3. A balancer for testing lawn mower blades as in claim 1 wherein the lower edge of the cone is positioned immediately adjacent the upper edge of the base and the upper surface of the base is hollowed out inwardly of the upper edge thereof to permit displacement of the lower edge of the cone thereinto whereby the outer surfaces of the cone and the base are essentially continuous when the cone is not displaced relative to the base due to asymmetric application of weight thereto.

4. A balancer as in claim 3 wherein the upper surface of the base is hollowed out inwardly from the upper edge thereof to the base of the pin whereby the cone edge may be displaced inwardly to a position of contact with the lower portion of the pin.

References Cited in the file of this patent
UNITED STATES PATENTS
2,270,657    Kraft _____ Jan. 20, 1942
FOREIGN PATENTS
914,789    Germany _____ July 8, 1954